United States Patent [19]
Burke et al.

[11] Patent Number: 5,991,800
[45] Date of Patent: Nov. 23, 1999

[54] METHOD AND APPARATUS FOR PROVIDING INTERNET SERVICE AT A SUBSCRIBER PREMISE

[75] Inventors: Timothy M. Burke, Algonquin; Douglas James Newlin, Geneva, both of Ill.

[73] Assignee: Motorola, Inc., Schaumburg, Ill.

[21] Appl. No.: 08/861,841

[22] Filed: May 22, 1997

[51] Int. Cl.$^6$ .............................. H04N 7/14; H04N 1/02
[52] U.S. Cl. .......................... 709/218; 709/219; 348/12; 455/5.1
[58] Field of Search .......................... 395/200.47–200.49; 348/6, 7, 12, 13, 10; 455/3.1, 4.1, 4.2, 5.1, 6.1, 6.3, 6.2; 709/217–219

[56] References Cited

U.S. PATENT DOCUMENTS 5,828,403 10/1998 DeRodeff et al. ......................... 348/7

Primary Examiner—John W. Miller
Attorney, Agent, or Firm—Terri S. Hughes; Romi Bose

[57] ABSTRACT

A multimedia interface station (102) establishes a multimedia sensory data link between the Internet (108) and a subscriber premise (112) eliminating an Internet protocol. Visual and audio data received from the Internet (108) is converted to a multimedia sensory signal at the multimedia interface station (102) and transmitted to a sensory transmission device (150) such as a television (142) in the subscriber premise (112) without using the Internet protocol.

21 Claims, 2 Drawing Sheets

METHOD AND APPARATUS FOR PROVIDING INTERNET SERVICE AT A SUBSCRIBER PREMISE

CROSS-REFERENCE TO RELATED APPLICATIONS

This application is related to the following United States Patent Applications, each incorporated by reference herein, with priority claimed for all commonly disclosed subject matter:

Newlin et al., U.S. patent application Ser. No. 08/658,792, filed Jun. 5, 1996, entitled "Audio/Visual Communication System and Method Thereof", Motorola Docket No. PD05634AM (the "first related application");

Burke et al., U.S. patent application Ser. No. 08/706,100, filed Aug. 30, 1996, entitled "Apparatus, Method And System For Audio And Video Conferencing And Telephony", Motorola Docket No. PD05686AM (the "second related application");

Burke et al., U.S. patent application Ser. No. 08/715,887, filed Sep. 18, 1996, entitled "Videophone Apparatus, Method And System For Audio And Video Conferencing And Telephony", Motorola Docket No. PD05689AM (the "third related application");

Newlin et al., U.S. patent application Ser. No. 08/672,819, filed Jun. 28, 1996, entitled "ISDN Communication System and Method Thereof", Motorola Docket No. PD05677AM (the "fourth related application");

Burke et al., U.S. patent application Ser. No. 08/725,602, filed Oct. 3, 1996, entitled "Apparatus, Method And System For Wireline Audio And Video Conferencing And Telephony", Motorola Docket No. PD05703AM (the "fifth related application"); and Burke et al., U.S. patent application Ser. No. 08/726,329, filed Oct. 3, 1996, entitled "Videophone Apparatus, Method And System For Wireline Audio And Video Conferencing And Telephony", Motorola Docket No. PD05725AM (the "sixth related application");

Newlin et al., U.S. patent application Ser. No. 08/735,295, filed Oct. 22, 1996, entitled "Apparatus, Method And System For Multimedia Control And Communication", Motorola Docket No. PD05688AM (the "seventh related application");

Burke et al., U.S. patent application Ser. No. 08/757,184, filed Nov. 27, 1996, entitled "Apparatus, Method And System For Wireless Audio And Video Conferencing And Telephony", Motorola Docket No. PD05709AM (the "eighth related application");

Newlin, U.S. patent application Ser. No. 08/763,159, filed Dec. 10, 1996, entitled "Apparatus, Method And System For Wireline Audio And Video Conferencing And Telephony, With Network Interactivity", Motorola Docket No. PD05752AM (the "ninth related application"); and Newlin et al., U.S. patent application Ser. No. 08/779,083, filed Jan. 6, 1997, entitled "Apparatus And Method For Multimedia Communications With Multiple Network Functionality", Motorola Docket No. PD05730AM (the "tenth related application").

Newlin et al., U.S. patent application Ser. No. 08/791,123, filed Jan. 30, 1997, entitled "Multimedia Input and Control Apparatus and Method For Multimedia Communications", Motorola Docket No. PD05732AM (the "eleventh related application").

BACKGROUND

Methods and systems have been developed in an attempt to satisfy the increasing demand for information, multimedia and other communication services to the subscriber premise. One of the most popular techniques of obtaining these services is through the Internet.

The Internet is collection of over 25,000 computer networks connected through a communication backbone (NSFNET backbone) funded by the National Science Foundation (NSF) and is currently managed by Advanced Network System (ANS). A subscriber obtains an account with an organization's host computer (server) that is connected to the Internet through one or more networks. Traditionally, the subscriber is connected to the server through telephone lines using a personal computer (PC) and a modem.

As use of the Internet becomes more popular, different methods of accessing the Internet have been developed. Internet accessing systems have been developed that do not require a personal computer (PC) at the subscriber premise. These systems, commonly referred to as "non-PC based", are attractive alternatives to subscribers that do not wish to purchase or use a PC.

Typical non-PC based systems include a cable television converter box (set top box) located at the subscriber premise and connected to the Internet through the cable television network. The set-top box is coupled to the cable television network either through a modem or using vertical (VBI) and horizontal (HBI) blanking intervals. VBI/HBI techniques utilize unused vertical and horizontal scan intervals of a video program channel to transmit data.

However, these systems are limited in speed because of limited available bandwidth. Conventional modems are designed to operate over dial-up phone lines or other low bandwidth media. VBI/HBI techniques are also limited in bandwidth since only a certain number of scan lines are available for general use and represent only a small fractional part of the total video bandwidth.

Conventional non-PC based systems are also limited in functionality. The subscriber is not able to download and store files because of memory limitations. The subscriber may not be able to access particular sites that require specific client system application software since the non-PC systems do not have the available processing power and memory to utilize multiple applications.

If the subscriber desires to have additional functionality, the subscriber must install additional equipment or software or both. As more equipment is connected to the set-top box, the system approaches the architecture, complexity and cost of a PC.

If a host computer requires a particular application software to view information, conventional systems require the subscriber to install the software on the access system.

Conventional PC based and non-PC based systems are limited in functionality to a particular location within the subscriber premise.

Therefore, there is need for an inexpensive and efficient multimedia access method and system that provides high speed Internet access throughout the subscriber premise.

DETAILED DESCRIPTION OF THE PREFERRED EMBODIMENT

The present invention provides a method and apparatus for inexpensively and efficiently establishing a multimedia sensory data link conveying Internet data between a subscriber premise and the Internet.

Internet data transmitted using Internet Protocol (IP) is received at an Internet interface such as a server computer. The Internet interface converts the Internet data into a multimedia sensory signal such as video or audio signal. The multimedia sensory signal is transmitted through a communication network using a digital protocol. A multimedia access apparatus receives the multimedia sensory signal and broadcasts an analog signal to at least one sensory transmission device such as a television through a subscriber cable network.

Control signals, from an input device such as keyboard or mouse, and other communication signals are received at the multimedia access apparatus and transmitted to the Internet interface through the communication network. The Internet interface responds to control signals and forwards the appropriate signals to the Internet using the Internet Protocol.

By establishing a multimedia sensory data link between the Internet and the subscriber premise, Internet data is transferred at high speed without using an Internet protocol. Application software to access the Internet, data memory and data processors are centrally located at the Internet interface allowing for minimal equipment and software at the subscriber premise. In addition, the application software and hardware may be shared among multiple users which increases the effective number of subscribers and lowers the cost to support each subscriber.

Figure 1:
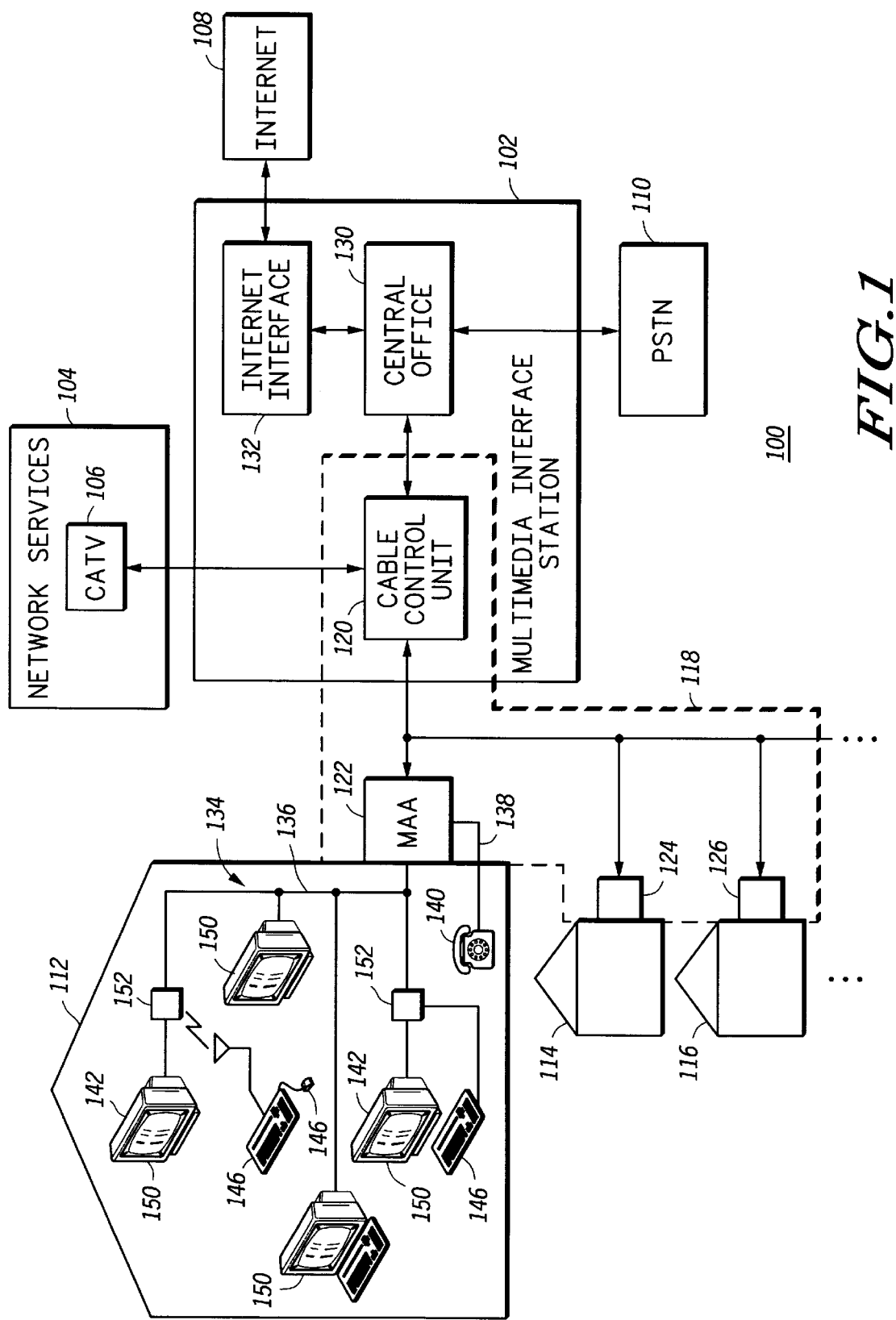
FIG. 1 is a block diagram of a communication system in accordance with a preferred embodiment of the invention.

FIG. 1 is a block diagram of a communication system 100 in accordance with a preferred embodiment of the invention. The various components comprising the communication system have been disclosed and discussed in detail in the related patent applications, and in the interests of brevity, only a brief overview of the components and their operation will be presented. A multimedia interface station (MIS) 102 couples network services 104 such as cable television (CATV) 106, the Internet 108, and a public switched telephone network (PSTN) 110 to subscriber premises 112–116 through a communication network 118 such as a telephony over cable communication network (cable communication network). As described in the related applications, the communication network 118 preferably consists of a centrally located cable control unit (CCU) 120 connected to several multimedia access apparatuses 122–126 through a communication channel 128 such as a hybrid fiber/coaxial cable. The communication network 118 provides telephony, Internet, and other services to the subscriber premise 112 by transmitting and receiving data using time division multiplexing (TDM) techniques between the multimedia access apparatus 122 and the CCU 120.

Preferably, CATV service is provided to the subscriber by combining a CATV signal from the CATV service provider with the TDM communication signals. In the preferred embodiment, the TDM communication signals are positioned within vacant channels in the CATV frequency spectrum.

As explained in the related applications, the multimedia access apparatus 122 couples the CATV signals to a subscriber cable network 134 within the subscriber premise 112. The subscriber cable network 134 may consist of several sections of coaxial cable 136, several sections of twisted pair wiring 138, splitters, amplifiers and other cable equipment. The subscriber cable network 134 connects the communication network 118, through the multimedia access apparatus 122, to customer premise equipment (140–146) such as telephones 140, televisions 142, video telephones 150, input devices 146, computers, video cameras, video recorders and modems. The CATV signals are received at a television 142 through the subscriber cable network 134.

TDM communication signals are converted to an appropriate format and transmitted through the subscriber cable network 134. Telephony signals are coupled to the telephone 140 through the multimedia access apparatus 122 and the twisted pair wiring 138 using appropriate analog to digital and digital to analog conversion of the TDM signals.

The MIS 102 consists of the CCU 120, a telephony central office (CO) 130 and an Internet interface 132. Preferably, the MIS 102 is centrally located in relation to the subscriber premises 112–116 that it services. However, the various functional blocks of MIS 102 may be geographically dispersed and the MIS 102 may contain multiple CCUs (120), COs (130), or Internet interfaces (132). For example, the CO 130 may be coupled to several communication networks (118) through other CCUs (120).

The CCU 120 is coupled to the CO 130 through a broadband channel such as a T1 or E1 interface. Telephone service such as POTS (Plain Old Telephone Service), ISDN (Integrated Services Digital Network) are provided through the central office 130 by coupling the CO 130 to the PSTN 110 using known techniques.

The CO 130 is coupled to the Internet interface 132 through, preferably, a T1 or E1 interface. The Internet interface 132, discussed in further detail below, couples to the Internet 108 using an Internet protocol (IP) and receives Internet data from the Internet. The Internet interface 132 converts the Internet data to a multimedia sensory signal. Preferably, the multimedia sensory signal is a digital signal conveying visual, audio or combination of audio and visual information received from the Internet.

The multimedia sensory signal is coupled through the CO 130 to the CCU 120 without using the Internet protocol. Although various analog or digital techniques as well as various digital protocols may be used to transmit the multimedia sensory signal to the CCU 120, the Internet interface 132, preferably, converts the Internet data to a compressed video telephony protocol such as ITU-T H.320 or H.324 which specifies a standardized layered protocol for the transmission of narrow-band visual/audio signals over the Public Switched Telephone Network (PSTN). Other digital protocols may also be used such as Moving Picture Experts Group (MPEG1), MPEG 2, MPEG 4, H.261, H.263, G.723, Joint Photographic Experts Group (JPEG), Moving JPEG (MJPEG), and High Definition Television (HDTV) depending on the particular communication system 100.

The multimedia sensory signal is coupled through the CO 130 to the CCU 120. The CCU 120 formats the multimedia sensory signal into the TDM protocol used in the communication network 118 (cable network protocol) and transmits the multimedia sensory signal to the multimedia access apparatus 122 serving the subscriber premise 112 accessing the Internet.

Preferably, the multimedia access apparatus 122 converts the digital multimedia sensory signal into a standard television signal before transmission through the subscriber premise network. In the preferred embodiment, the standard television signal is an RF analog audio/video signal having a bandwidth of 6 MHz. However, the standard television signal may be any of other standard signals such as (High Definition Television) HDTV. The multimedia access apparatus 122 converts the digital multimedia sensory signal into a standard NTSC/PAL composite video and analog signal, shifts the resulting signal to a vacant channel within the communication frequency band and transmits the resulting RF audio/video signal (standard television signal) throughout the subscriber premise 112 through the subscriber cable network 134.

The RF audio/video signal is received by a sensory transmission device such as the television 142 and visually or audibly presented to the subscriber in a form perceivable by the subscriber.

Digital control signals such as keyboard and mouse signals as well as other information such as outgoing data are combined and converted to an RF signal which is coupled through the multimedia input and control apparatus 152 to the subscriber cable network 134 as described in the eleventh referenced application. The multimedia access apparatus 122 receives the RF signal, converts it to a digital signal and forwards the control signals and the outgoing data (upstream Internet signal or upstream Internet information) to the CCU 120. The multimedia access apparatus 122 transmits the upstream Internet signal to the CCU 120 using the cable communication protocol over the cable communication channel 128. The CCU 120 converts the upstream Internet signal to the appropriate telephony protocol and transmits the upstream Internet signals to the Internet interface 132 through the CO 130. The Internet interface 132 responds to control signals sent by the subscriber contained in the upstream Internet information and transmit upstream World Wide Web browsing information through the Internet using the Internet protocol. For example, a keyboard instruction indicating to scroll down (control signal) is received by the Internet interface. The Internet interface responds to the keyboard signal by transmitting a corresponding signal using the IP to the Internet. If a data file (upstream Internet data) is transmitted by the subscriber, the Internet interface forwards the file to the Internet.

In the preferred embodiment, a subscriber accesses the Internet by making a video telephone call to the Internet interface 132 using an input device 146 and a sensory transmission device 150. The multimedia access apparatus 122 receives control signals from the input device 146 through a multimedia input and control apparatus 152 coupled to the subscriber cable network 134 instructing the multimedia access apparatus 122 to establish an Internet link. The multimedia access apparatus 122 establishes a video call with the Internet interface 132 through the communication network and the CO 130. The upstream data channel of the video call is used for transmitting the control signals and any keyboard, video, or audio data that is to be sent through the Internet.

Although in the preferred embodiment the communication network 118 is a cable communication network, other communication networks may be used such as telephony networks using twisted pair wiring, cellular telephone networks, radio communication networks and satellite communication networks. For example, in a telephony network using twisted pair wiring, the Internet interface 132 transmits the multimedia sensory signal and receives the upstream Internet signals through the CO 130 and the telephony network. The multimedia access apparatus 122 transmits and receives signals over the telephony network using, for example, H.320 video telephony protocol. In this case the communication channel 128 is twisted pair wiring or a combination of media such as fiber optic cable and twisted pair wiring.

In a first alternate embodiment, the Internet interface 132 is connected to the CCU 120 without coupling through the CO 130. Operation is as described above except that signals coupled between the Internet interface and the CCU 120 are not required to be compatible with the CO 130. Although in the first alternate embodiment the Internet interface is directly connected to the CCU 120, the Internet interface may be part of the Network Services 104.

In a second alternate embodiment, the Internet interface 132 is connected within the PSTN 110. Operation is as described above in reference to the preferred embodiment except that the Internet interface may physically located anywhere within the PSTN 110. An advantage of the second alternate embodiment is that the Internet interface may service multiple central offices (130).

In summary, a broadband communication link is established between the Internet interface 132 and a subscriber premise 112 by converting the Internet data to a multimedia sensory signal and transmitting the multimedia sensory signal to a sensory transmission device 150 where it is converted to a sensory signal that can be perceived by the subscriber. In other words, a video telephone call is established between the subscriber premise 112 and the Internet interface 132, allowing for video and audio information from the Internet to be conveyed to the subscriber without using an Internet protocol. Client application software is located at the Internet interface 132 allowing for minimal hardware and software at the subscriber premise 112.

Figure 2:
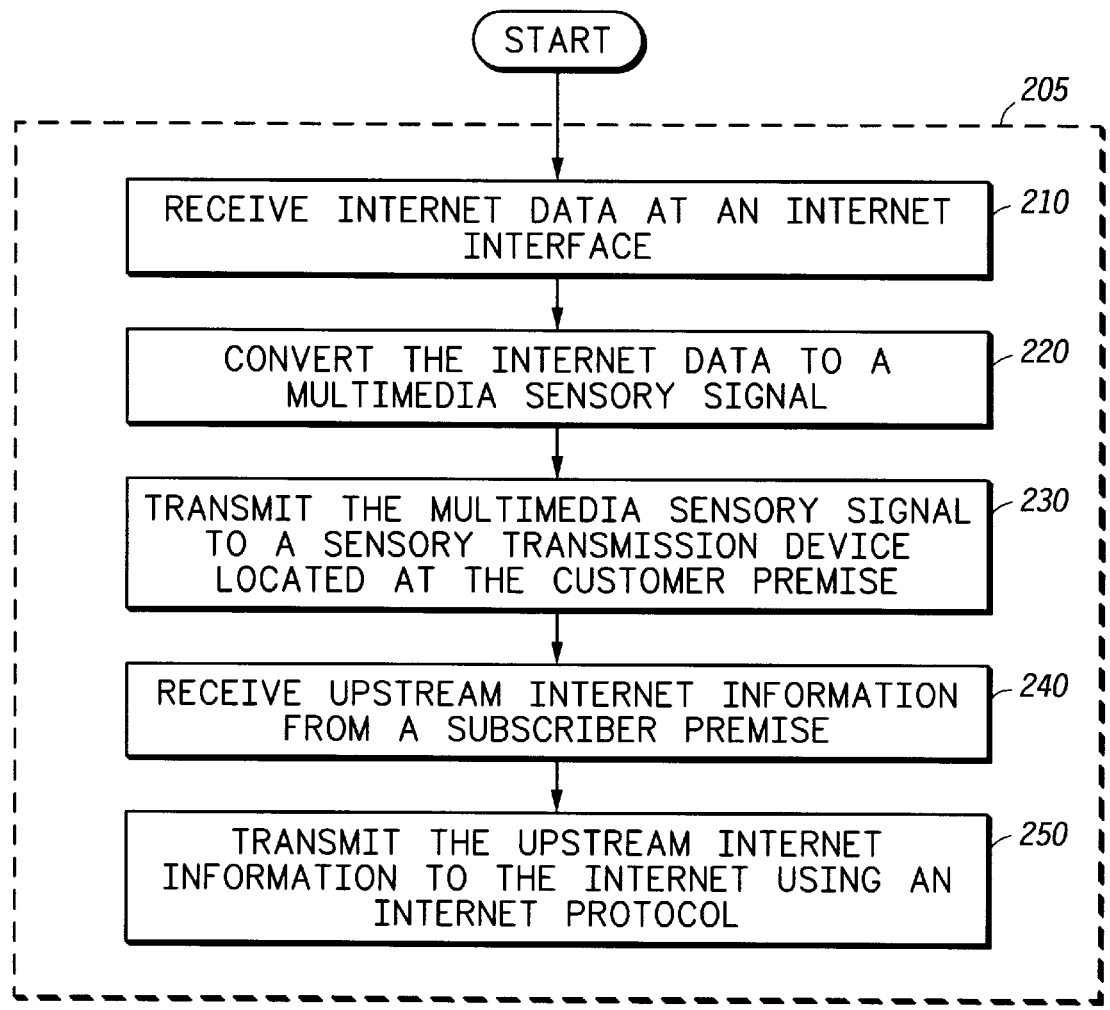
FIG. 2 is a flow chart of method in accordance with the preferred embodiment of the invention.

FIG. 2 is flow chart of a method in accordance with the preferred embodiment of the invention.

At step 205 a multimedia sensory data link conveying Internet data between an Internet interface 132 and a subscriber premise 112 is established to eliminate an Internet protocol.

Step 205 begins at step 210 where Internet data is received at the Internet interface 132. The Internet data is received from an Internet 108 using an Internet protocol over, preferably, a T1 interface.

At step 220, the Internet interface 132 converts the Internet data to a multimedia sensory signal. Visual and/or audio data contained within the Internet data is converted to a multimedia sensory signal eliminating the Internet protocol.

At step 230, the multimedia sensory signal is transmitted from the Internet interface 132 to a sensory transmission device 150 within the subscriber premise using a digital protocol. Preferably, the multimedia sensory signal is transmitted through a communication network 118 using a video telephony protocol such as ITU-T H.320 or H.324. The multimedia sensory signal is received by the sensory transmission device 150 such as a television 142 through the subscriber premise network 134 and presented to the subscriber.

At step 240, upstream Internet information is received from a subscriber premise 112. Upstream Internet information such as control signals and other data is coupled from a multimedia input and control apparatus 152 through the subscriber premise network 134 to the multimedia access apparatus 122. The multimedia access apparatus 122 transmits the upstream Internet information to the Internet interface through the communication network 118.

At step 250, the Internet interface 132 transmits the upstream Internet information to the Internet using an Internet protocol.

Therefore, a multimedia sensory data link conveying Internet data between an Internet interface 132 and a subscriber premise 112 is established to eliminate an Internet protocol. The Internet interface 132 converts Internet data from the Internet to multimedia sensory signal that transmitted to a sensory transmission device such as a television in the subscriber premise using a digital protocol through communication network. Upstream Internet information received at the Internet interface from the subscriber premise is transmitted to the Internet using the Internet protocol.

By using the method and apparatus of the invention, high speed Internet access is provided at a plurality of locations within a subscriber premise without the need for a PC. A standard television may be used to browse the "Web".

We claim:

1. A method of establishing a multimedia sensory data link conveying Internet data between an Internet interface and a subscriber premise, wherein the Internet interface is remotely located from the subscriber premise, to eliminate an Internet protocol comprising, at the Internet interface:

receiving a multimedia sensory signal conveying control signals from the subscriber premise;

converting the digital control signals into World Wide Web browsing information; and transmitting the World Wide Web browsing information to an Internet using the Internet protocol.

2. A method according to claim 1 further comprising at the Internet interface:

receiving the Internet data from the Internet over the Internet protocol; and converting the Internet data received from the Internet into a multimedia sensory signal using a digital protocol.

3. A method according to claim 2 further comprising, at the subscriber premise:

receiving the multimedia sensory signal from the Internet interface;

converting the multimedia sensory signal into an analog signal; and broadcasting the analog signal to at least one sensory transmission device.

4. A method according to claim 2 wherein the digital protocol is selected from the group consisting of Moving Picture Experts Group (MPEG1), MPEG 2, MPEG 4, H.320, H.261, H.324, H.263, G.723, Joint Photographic Experts Group (JPEG), Moving JPEG (MJPEG), and High Definition Television (HDTV).

5. A method according to claim to claim 1 wherein the step of receiving multimedia sensory signal comprises the steps of, at the subscriber premise:

wirelessly transmitting control signals from an input device to a multimedia input and control; and transmitting the control signals through a subscriber cable network to a multimedia access apparatus.

6. A method according to claim 1, wherein the Internet data includes visual display information.

7. A method according to claim 1, wherein the Internet data includes audio information.

8. A method of establishing a multimedia sensory data link conveying Internet data between an Internet interface and a subscriber premise to eliminate an Internet protocol comprises:

receiving the Internet data at the Internet interface;

converting the Internet data to a multimedia sensory signal;

transmitting the multimedia sensory signal to a sensory transmission device located at the subscriber premise;

receiving the multimedia sensory signal at the subscriber premise;

converting the multimedia sensory signal to a standard television signal; and transmitting the standard television signal to at least one television within the subscriber premise.

9. A method according to claim 8, wherein the step of converting the multimedia sensory signal comprises the step of converting the multimedia sensory signal to an analog video signal.

10. A method according to claim 8, wherein the step of converting the multimedia sensory signal comprises the step of converting the multimedia sensory signal to an analog audio signal.

11. A multimedia interface station comprising:

an Internet interface for receiving control signals from a remotely located subscriber premise to create World Wide Web browsing information in order to access an Internet using an Internet protocol and for converting Internet data to a multimedia sensory signal to eliminate the Internet protocol; and a cable control unit coupled to the Internet interface for transmitting the multimedia sensory signal to the subscriber premise using a digital protocol.

12. A multimedia interface station according to claim 11 wherein the digital protocol is selected from the group consisting of Moving Picture Experts Group (MPEG1), MPEG 2, MPEG 4, H.320, H.261, H.324, H.263, G.723, Joint Photographic Experts Group (JPEG), Moving JPEG (MJPEG), and High Definition Television (HDTV).

13. A multimedia interface station according to claim 11 further comprising a central office coupled between the cable control unit and the Internet interface, the central office coupling the multimedia sensory signals from the Internet interface to the cable control unit using a telephony protocol.

14. A multimedia interface station according to claim 13, the central office coupling the upstream user input data from the cable control unit to the Internet interface using the telephony protocol.

15. A multimedia interface station according to claim 13, wherein the Internet interface is responsive to the control signals by transmitting the World Wide Web browsing information to the Internet using the Internet protocol.

16. A multimedia interface station according to claim 11, wherein the multimedia sensory signal includes visual information.

17. A multimedia interface station according to claim 11, wherein the multimedia sensory signal includes audio information.

18. A multimedia interface station according to claim 11, wherein the cable control unit transmits the multimedia sensory signal to the subscriber premise through a cable communication network.

19. A system comprising:

a sensory transmission device for conveying control signal information from a user;

a multimedia access apparatus, coupled to the sensory transmission device, responsive to activation of the sensory transmission device for converting the control signals into a multimedia sensory signal using a digital protocol;

an Internet interface, having client application software shared among multiple users, for converting the control signals into World Wide Web browsing information in order to access an Internet;

a first connection remotely connecting the multimedia access apparatus to the Internet interface; and a second connection coupling the Internet interface to the Internet.

20. A system according to claim 19, wherein the digital protocol is selected from the group consisting of Moving Picture Experts Group (MPEG1), MPEG 2, MPEG 4, H.320, H.261, H.324, H.263, G.723, Joint Photographic Experts Group (JPEG), Moving JPEG (MJPEG), and High Definition Television (HDTV).

21. The apparatus according to claim 19 wherein the Internet interface further receives Internet data from the Internet over an Internet protocol, converts the Internet data received from the Internet into a multimedia sensory signal using a digital protocol, and transmits the multimedia sensory signal to the multimedia access apparatus.

* * * * *